United States Patent [19]
Guo et al.

[11] Patent Number: 5,452,333
[45] Date of Patent: Sep. 19, 1995

[54] DIGITAL JITTER CORRECTION METHOD AND SIGNAL PRECONDITIONER

[75] Inventors: Bin Guo, Cupertino; Michael N. Behrin, DanJose, both of Calif.

[73] Assignee: Advanced Micro Devices, Inc., Sunnyvale, Calif.

[21] Appl. No.: 901,360

[22] Filed: Jun. 19, 1992

[51] Int. Cl.⁶ .............................................. H04L 7/00
[52] U.S. Cl. .................................... 375/371; 327/175
[58] Field of Search ....................... 375/118, 371, 346; 328/162, 155, 111, 112, 163, 164; 307/265, 234, 266, 267, 590, 591, 600, 601; 371/6; 327/141, 160–163, 172, 175

[56] References Cited

U.S. PATENT DOCUMENTS

| | | | |
|---|---|---|---|
| 4,074,358 | 2/1978 | Caputo et al. | 307/234 |
| 4,527,075 | 7/1985 | Zbinden | 307/234 |
| 4,881,041 | 11/1989 | Kawanabe et al. | 307/234 |
| 4,904,947 | 2/1990 | Olivenbaum et al. | 307/234 |
| 5,023,892 | 6/1991 | Stoica | 375/118 |

FOREIGN PATENT DOCUMENTS

| | | |
|---|---|---|
| 0011699 | 10/1979 | European Pat. Off. |
| 2176977 | 1/1987 | United Kingdom |

OTHER PUBLICATIONS

"IBM Technical Disclosure Bulletin" vol. 32 No. 5B, Oct. 1989 (NR/NRZI Data Modulation–Demodulation).

Primary Examiner—Stephen Chin
Assistant Examiner—Hai H. Phan
Attorney, Agent, or Firm—Gerald M. Fisher

[57] ABSTRACT

Apparatus and methods for modifying an incoming binary serial data stream to reduce the Duty Cycle Distortion jitter which involves comparing the time between adjacent transitions and correcting the jitter by inserting delay before the early transition for reducing the peak-to-peak distribution of said jitter.

11 Claims, 10 Drawing Sheets

DIGITAL JITTER CORRECTION METHOD AND SIGNAL PRECONDITIONER

FIELD OF THE INVENTION

This invention relates to duty cycle distortion cancellation in digital transmission links and in particular to all digital methods and all digital apparatus for reducing timing jitter and duty cycle distortion.

RELATED APPLICATION

The applicant has simultaneously filed the below listed patent applications each of which relate to aspects of a high data rate digital transmitter-receiver system, said applications are incorporated herein by reference:
1. "Digital Data Serializer and Time Delay Regulator," Ser. No. 07/901,312; filing date Jun. 19, 1992; inventor Bin Guo and James Kubinec.
2. "Digital Data Recovery Using Delay Time Rulers," Ser. No. 07/901,335; filing date Jun. 19, 1992; inventor Bin Guo.

BACKGROUND OF THE INVENTION

Digital systems traditionally require a frequency source or "clock" as a reference for timing internal and external operations. The stability of the clock is not particularly demanding in those systems where all operations are timed by the same clock. However, in asynchronous transmission systems where all transfers are made from one synchronous system to another, even where the clock frequencies are the same on a long term basis, short term variations in either clock can degrade the data. Irrespective of clock stability at both ends of a transmission link, phase noise arises which is exaggerated at the receiver end because of external electrical disturbances or changing physical parameters in the transmission link or channel. These are called timing jitter. To this date, reduction of jitter at the receiver end, caused by the transmission channel has not been undertaken.

In the copending above referenced application, entitled Digital Data Recovery Using Delay Time Rulers, the applicant has disclosed a data recovery receiver system which does not employ a phase locked loop for data recovery but employs instead a system employing digitally controlled delay lines. The digitally controlled delay line time ruler data recovery system of our copending application is limited to use in situations where the peak-to-peak timing jitter is less than 50% of the nominal bit clock period. The invention of this patent is to provide apparatus and methods to reduce the timing jitter on serial-in digital data. A serial combination of this jitter correction apparatus and the aforementioned receiver will enable an increase in the useful range of the delay line time ruler type data separator for recovering data with peak-to-peak jitter greater than 50% in the presence of duty cycle distortion.

In a data transmission system, the receiver performs data recovery of the incoming serial signal data generated and sent by a transmitter and propagated through transmission medium. The edges of the transitions in the data stream provide both the data and the timing information of the transmitted data. These transitions are supposed to arrive at the receiver at time intervals that equal the bit period, or a multiple of the bit period. When no timing jitter is present in the data, these ideal timing instants are called timing "epochs." In practice, however, each edge arrives at an instant earlier or later than those epochs due to the timing jitter from various jitter sources. Jitter comes in both random and deterministic forms. Jitter that is completely random in nature is called Random Jitter (RJ). A partially random form of jitter is called Data Dependent Jitter (DDJ) which as its name implies, depends partially on the data sequence or data pattern. Deterministic jitter is typically the Duty Cycle Distortion (DCD) which mainly comes from unequal rising and falling delays arising from the channel, or various stages between the transmitting circuitry and the data recovery circuitry, which includes buffering, preamplification, level-translating and other coupling stages. The overall histogram of edge arrival times with respect to the timing epoch is the sum of the distribution of the various above sources of jitter. Depending on which jitter type is dominant, the total edge distribution could have only one peak, or could have multiple peaks. If the DCD jitter is dominant, two or more peaks will be observed. In other words, the peaks of the rising and falling edge distributions will not be coincident with the timing epoch.

The term "jitter correction" has been used in the prior art. However, in the prior art the jitter corrections were addressed to jitter introduced by different sources than the sources addressed by this invention. The prior art which addressed jitter compensation or reduction on the receiver side are mostly performed to remove or reduce the effects of phase error or timing jitter introduced during the timing recovery process. One such example is U.S. Pat. No. 4,831,637 in which the timing jitter caused by the timing recovery circuit itself is reduced or eliminated. Another example is in U.S. Pat. No. 4,847,875 in which the timing jitter caused by the overhead bit or so-called stuffing bit removal is compensated.

A need exists to have a method and apparatus to reduce the timing jitter in serial incoming data or to reduce or to remove the Duty Cycle Distortion Components of the timing jitter.

A need also exists for an all-digital method and apparatus to correct a duty cycle distorted clock signal, when a 50% duty cycle signal is necessary. Prior art for achieving a perfect 50% duty cycle signal involves frequency multiplexing, that is to multiply the signal frequency to twice or higher, and then divide the frequency to its original value by using flip flops with matched clock-to-output-rise and clock-to-output-fall delays. Problems with these approaches relate to the higher frequency operations. Also, most often a phase locked loop (PLL) type analogue circuit is required to do the frequency multiplexing.

SUMMARY OF THE INVENTION

It is an object of my invention to provide a jitter reduction scheme which reduces the total timing jitter in an incoming serial data.

It is a further object to provide a jitter correction which compensates for Duty Cycle Distortion.

It is a still further object to provide an all digital correction for DCD jitter in serially transmitted binary data which is amenable to implementation in digital processing technology.

It is a feature of this invention that it employs a variable controlled delay line having series connected, unit time delays equal to $\frac{1}{2}$ period of the receiver data bit period.

We provide a method and apparatus which determines whether DCD jitter is present in said incoming serial data and provides corrective measures to decrease it by applying appropriate delay. The technique employs means to determine whether the probability of a group of transitions being early is systematically greater than the probability of being late and then appropriately applying delay to the proper transitions to reduce the DCD jitter.

BRIEF DESCRIPTION OF THE DRAWINGS

FIG. 1(a)-1(i) are illustrative of edge distributions with respect to the epoch for various jitter conditions.

DETAILED DESCRIPTION OF THE INVENTION

Figure 2:
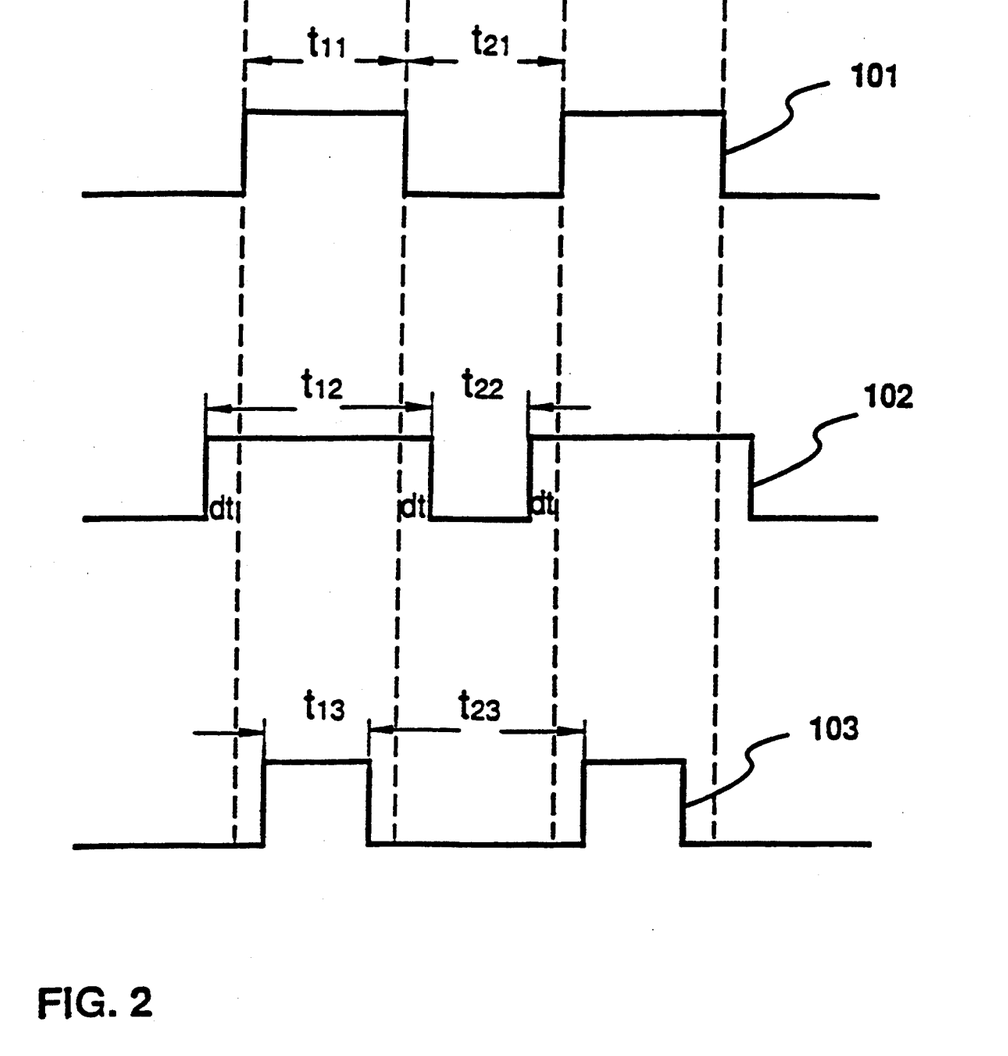
FIG. 2 is waveform illustrative of DCD jitter.

With reference to FIG. 2, continuous square wave 101 illustrates a condition where the time period $t_{11}$ from rising to falling transition equals the time period $t_{21}$, the time from falling to rising transition. The Duty Cycle Distortion for this waveform is zero. Both wave 102 and 103, in which the times differ, will result in a DCD. Waveform 102 shows a rising early and falling late type error and 103 shows a rising late and falling early type error.

Figure 1:
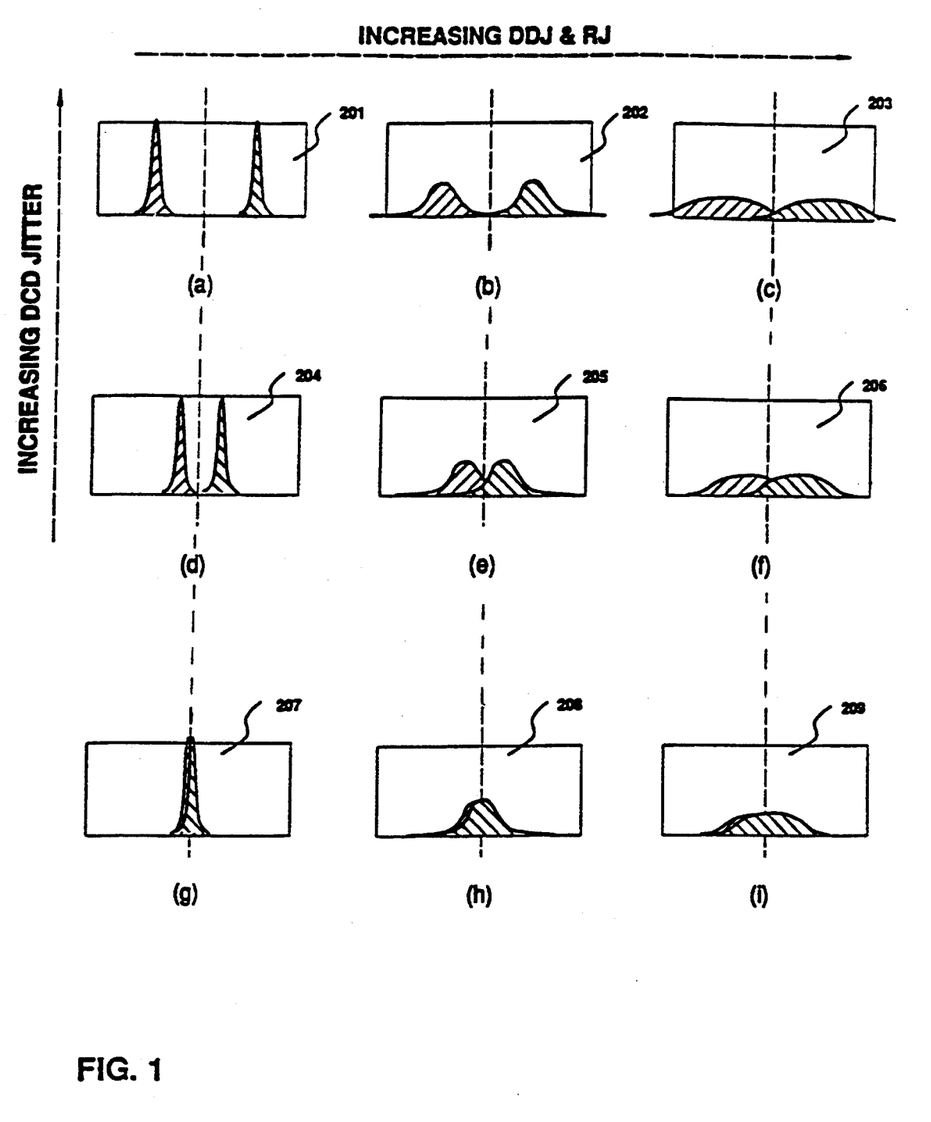

With reference to FIG. 1, edge distributions are illustrated which characterize various jitter conditions. Diagrams FIGS. 1(a), 1(b) and 1(c) show the edge distribution histogram when the DCD jitter is dominant. The perfect timing epochs are represented by the dashed central lines in each diagram and the two shaded regions represent the rising edge distribution to the left and the falling edge distribution to the right respectively. The distance between a peak and the epoch represents the average magnitude, or the "DC" component of the DCD. The "width" or the spread of the shaded region represents the "AC" component of the portion contributed from the DDJ and RJ. In FIG. 1(b), 1(c), 1(e) and 1(f), Data Dependent jitter (DDJ) and Random jitter (RJ) are also significant causing some rising edges to appear across the epoch as does the falling edge distribution. In FIG. 1(f), the DCD is small and the DDJ and RJ are dominant. FIG. 1(c) is the situation when all types of Jitter are significant. FIG. 1(g), (h) and (i) illustrate the edge distributions when the DC value of the DCD is canceled. Obviously, the jitter cancellation improvement would be small in those instances where the "DC" component of the DCD is small.

Figure 3:
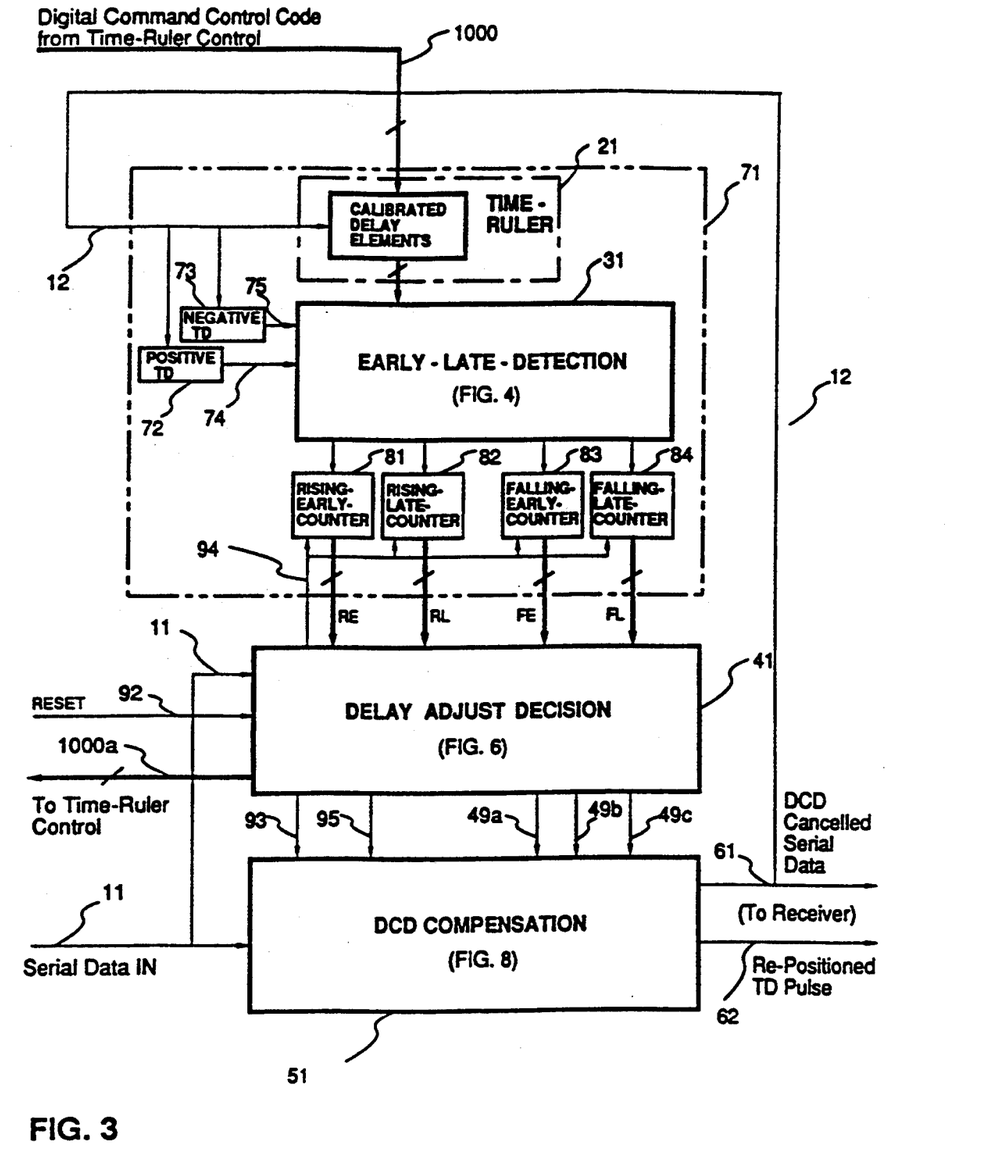
FIG. 3 is block diagram of a circuit to cancel DCD jitter.

With reference to FIG. 3, we describe the digital technique of our invention of measuring rising-to-falling and falling-to-rising time intervals and comparing it to a nominal time interval to find if the particular edge comes early or late. After making a number of such measurements, the DCD can be corrected by applying appropriate delays, a step at a time, to the edge group (rising or falling) which has the higher probability of being early. The process can be continuously applied to reduce the DCD to acceptable limits.

With reference to FIG. 3, the serial data IN, on line 11, is applied to DCD detector circuit 71 via line 12 after passing through the DCD Compensation Circuit 51. Circuit 71 determines whether the rising-to-falling interval is longer than the falling-to-rising interval. The result is recorded by Delay Adjust Decision Circuit 41 which decides how to adjust the digitally controlled DCD Compensation Delay Circuit 51 to oppose the DCD.

Initially, on power up, the DCD compensation circuit is reset by a reset signal on line 92 such that the delay correction for rising edges and falling edges are the same, i.e., there is no starting DCD compensation. The DCD Detector 71 receives the serial data on line 61 with delay added by DCD compensation circuit. The DCD Detector Circuit 71 begins to detect the early-late status of the edges as they arrive and the counters 81 through 84 start to count and create the statistics of edge status. After a predefined number of edges have arrived, or the counters have accumulated enough counts to be statistically meaningful, a decision is made to adjust the delays of DCD compensation 51. This is accomplished by incrementing the delays of one type of edge by a step to oppose the Duty Cycle Distortion. During the next detection period, different edge distribution and reduced DCD can be expected because of the adjustment made. This process continues until the DCD has been reduced to a value within predetermined specification.

More particularly, with reference to FIG. 3, the DCD Detector 71 includes a calibrated delay time ruler circuit 21, an early-late detection circuit 31 and four counters 81-84 which count the number of early and late edges for rising and falling edges respectively. If DCD jitter is present, the opposing counters 81-82 and 83-84 will have different counts because the edge they are tracking do not have equal numbers of early and late arrivals. Also, if both rising and falling edge count values are found to be both early or both late, a frequency difference between the incoming data and the time ruler must exist. For example, if all the edges arrive "early" in comparison to the time epoch set by the time ruler, a conclusion can be reached that the time ruler is too long, and needs to be shortened. This information can be used, as described more fully in copending reference application "Digital Data Recovery Using Delay Time Rulers," AMD Docket Number A860, in Delay Adjustment Decision circuit 41 to send control signals on bus 1000a to the time ruler control circuit to adjust the time ruler delay.

The Delay Adjust Decision circuit 41 sends control signals to DCD compensation block 51 which employs controlled delays for DCD jitter correction. The corrected output version of the Serial Data In is sent out on line 61 to a data recovery circuit. This DCD compensated data signal on line 61 is also sent back to the DCD detector via line 12. Another form of DCD corrected data is sent out of DCD Compensation block 51 on line 62. These are the repositioned pulses corresponding to the data transitions, and are used by the time-ruler data recovery scheme to be subsequently described.

DCD DETECTOR

Figure 4:
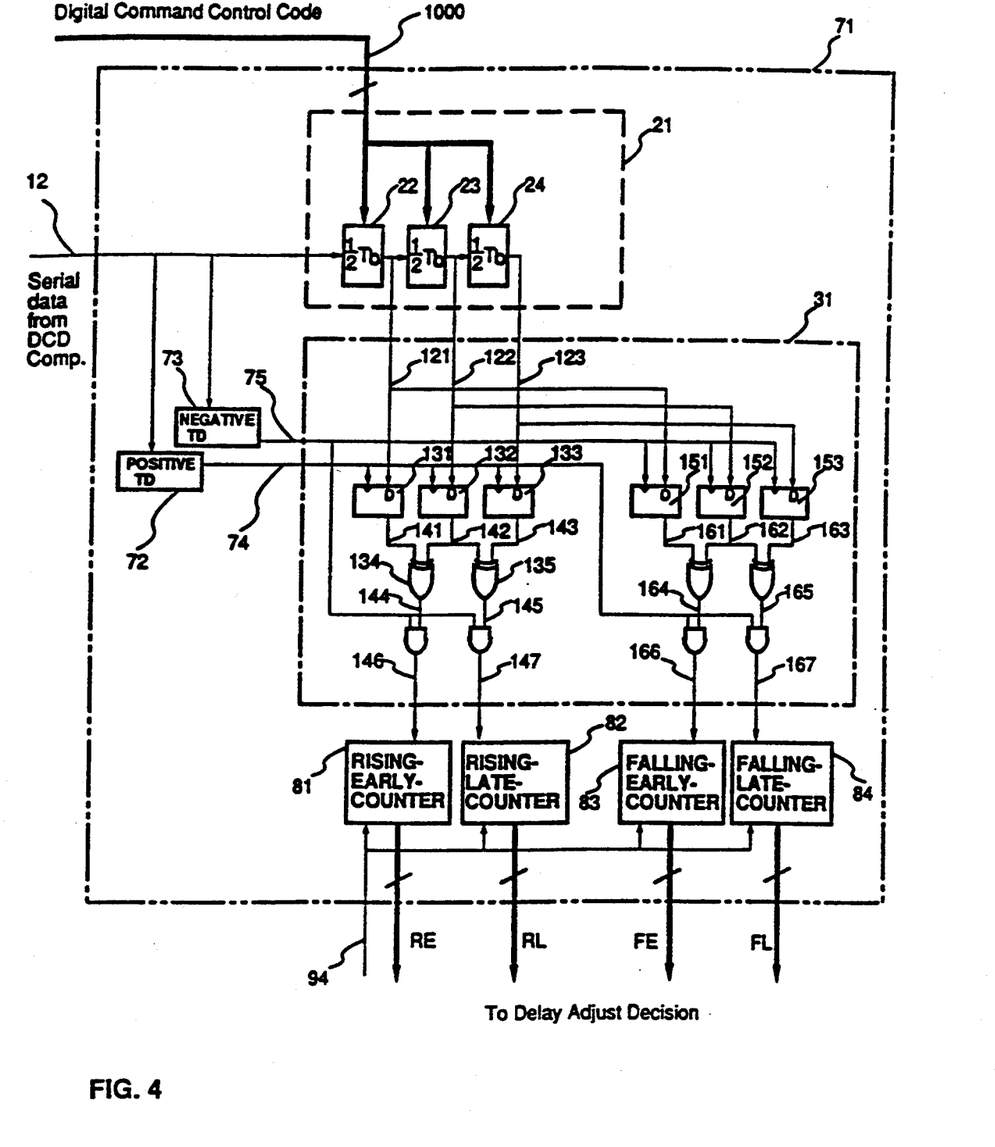
FIG. 4 is a schematic of a logic diagram of the DCD detector portion of the cancellation circuit.
Figure 5:
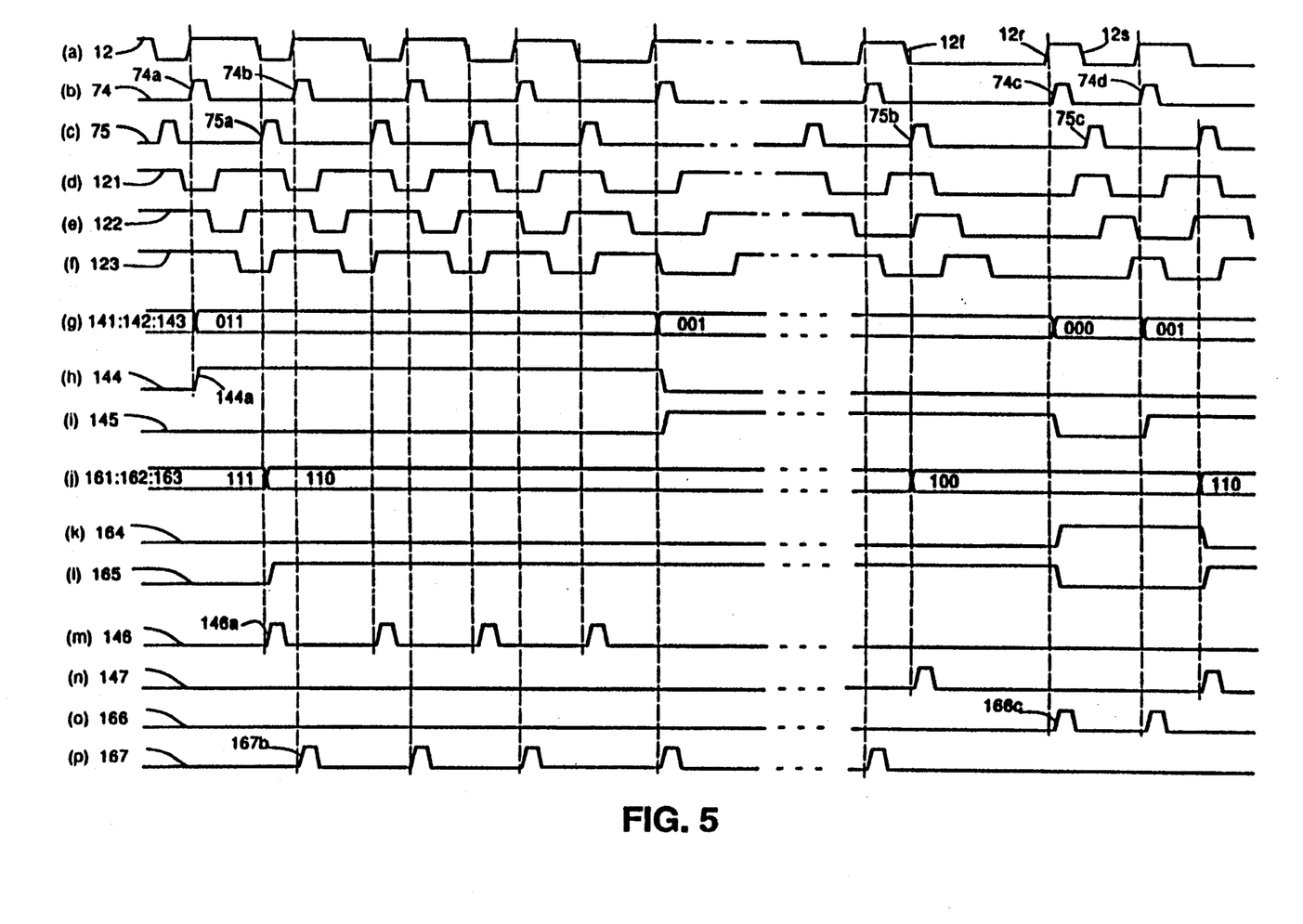
FIG. 5 is the timing diagram for FIG. 4.

With reference to FIG. 4, the DCD jitter detection logic is explained. Elements 22, 23, and 24 are controlled delay elements calibrated so that their individual delays equal half of the bit period of a jitter-free incoming data signal. Consider first the situation in which the incoming serial data (NRZI) sequence "11" arrives at line 12 under the ideal condition in which there is no timing jitter. When the second "1" arrives at the input of element 22 on line 12, the previous transition should be arriving at line 122, having been delayed by exactly one bit time interval in unit delay 22 and 23. However, if there is timing jitter on the incoming signal, the previous transition will be somewhere in delay element 23 or 24 depending on whether the time interval between transitions is longer or shorter than the ideal bit period. If the current transition is a rising edge, then the previous transition must be a falling edge. The positive-transition-detector 72 detects rising edges and generates a narrow pulse at 74 for each rising edge, as shown in FIG. 5(b). The negative-transition-detector 73 generates a narrow pulse at 75 for each falling edge of the incoming data signal, FIG. 5(c). These two narrow pulses become the sampling clocking signals for the group of D-type flip flops (D-FF) 131,132,133 and 151,152,153 respectively. D-FFs 131, 132, and 133 sample the signal on input D whenever a rising transition arrives at line 12, and thus capture the signal level values of lines 121, 122, and 123. These values are used to determine whether the time interval between the arrival of the previous transition and the current one is shorter or longer than the nominal data transition interval or the nominal data bit period. The sampled data at line 141,142,143 is applied to two exclusive-OR gates, 134 and 135, the output from which are shown in FIG. 5(h,i). A logic value difference at the two inputs of the exclusive OR gate (XOR) indicate a level change or a transition, resulting in a "1" at the output of the XOR, FIG. 5(h,i). A "1" at the output of gate 135 indicates a rising edge "late" status. A rising edge "early" status is indicated by a "1" at the output of gate 134. For example, sampled data of value (0,1,1) at nodes 141, 142, and 143 respectively would result in a (1,0) output at inputs 144 and 145, indicating that at the time a rising edge arrives on line 12, the previous falling transition is somewhere within (or entering) delay block 23. The current rising edge has thus arrived with an "early" status. This would cause a pulse at 146, FIG. 5(m) when the following falling edge comes to line 12 the narrow pulse 75a FIG. 5(c) produced by negative transition detector 73 is gated through by output 144 being a "1" to cause a pulse at 146, causing the "Rising-Early-Counter" 81 to increment by 1. The signal at 147, FIG. 5(n) for the "Rising-Late-Counter" 82 remains unchanged since the pulse from 75 is blocked by the "0" at 145. The same analysis applies to the right side of the detector for falling edges, with the exception that the narrow pulse at 75 is generated by a falling edge. This pulse samples the data at nodes 121, 122, and 123 into D-FFs 151, 152, and 153, while the signal at 74 is used to clock the counters 83 and 84 for tracking early and late falling edges. If the variation of the time intervals between any two consecutive transitions, or the timing jitter for any edge is within ±50% of the nominal bit period, then the sampled data at line 141, 142, and 143 have the following possible value combinations: When a rising edge arrives at line 12:

(0,1,1)—Rising edge early, Rising-Early-Counter 81 incremented;

(0,0,1)—Rising edge late, Rising-Later-Counter 82 incremented;

(0,0,0)—The previous bit is a "0", no counter incremented.

Similarly, the sampled data at lines 161, 162, and 163 can have the following value combinations. When a falling edge arrives at line 12:

(1,0,0)—Falling edge early, Falling-Early-Counter 83 incremented;

(1,1,0)—Falling edge late, Falling-Late-Counter 84 incremented;

(1,1,1)—The previous bit is a "0", no counter incremented.

The (1,1,1) and (0,0,0) combinations above result when there are at least one "0" between two "1s" such that the two consecutive transitions are spaced more than 1.5 bit times apart. When one comes to line 12, the previous one has passed line 123. They do not cause any change to the counters, hence these samples are not used to detect the DCD of the incoming data. Only a "11" data sequence is used for detecting the DCD condition. The Delay Adjust Decision block 41 has the logic to react to the contents of the 4 counters to make a decision as to whether Controlled Delay elements in 51 needs to be adjusted, to compensate for the detected DCD. If the data detected shows that both rising and falling edges are in the same offset direction, indicating a frequency difference between the incoming data and the time-ruler, a correction signal to the time-ruler control block can be provided through line 1000a.

In FIG. 5, the Timing diagram for the DCD detection process is shown. FIG. 5(a) is the serial data on line 12. The first 4 cycles in the diagram show a constant DCD offset condition of the type of Figure 2,102. FIG. 5(d), (e) and (f) are the delayed waveforms of (a) on line 121, 122 and 123, each delayed by half of the bit period determined by the Time Ruler. The rising edge 74a from the positive transition detector 72 on line 74 samples the logic value of 121, 122, 123, into D flip flops such that their outputs 141:142:143 has a value of "011". This causes the output 144 of XOR 134 to change to "1" (144a). The pulse 75a from the negative transition detector 75 is gated by the output on 144 to generate a clock pulse 146a at 146, which increments the rising-early-counter 81. Simultaneously, pulse 75a samples the logic value of 121, 122, 123 as "110" into the D flip flops 151, 152, 153 for the falling edge group, the outputs of which (161:162:163) become "110". The next rising edge generates pulse 74b, which is gated through to produce a clock pulse 167b on line 167 since 165 has a logic value of "1". The Rising-Early-Counter 81 and Falling-Late-Counter 84 get incremented every cycle for the 4 cycles, while the Rising-Late and Falling-Early counters remain unchanged. The incoming data (a) show various DCD conditions on the right side of the diagram. Pulse 75b from the falling edge 12f samples the logic value "100" of 121:122:123 into 161:162:163 so the output of the XOR 164 changes to "1" while 165 changes to "0". Since there is a missing transition or a data bit "0" between 12f and 12r, the falling-early status of 12f cannot be registered until the following rising edge 12r arrives, which causes pulse 74c to generate clock pulse 166c for incrementing the Falling-Early- Counter 83. Simultaneously, pulse 74c samples logic value of 121:122:123 ("000") into 141:142:143, which makes both XOR 134 and 135 output a "0" and when the following pulse 75c caused by falling edge 12s comes, no pulse is gated through to generate clock pulses at 146 or 147. Therefore no early-late status is recorded for the rising edge 12r. This example demonstrates that only "11" data sequence in a NRZI coded data contributes to DCD detection.

Figure 6:
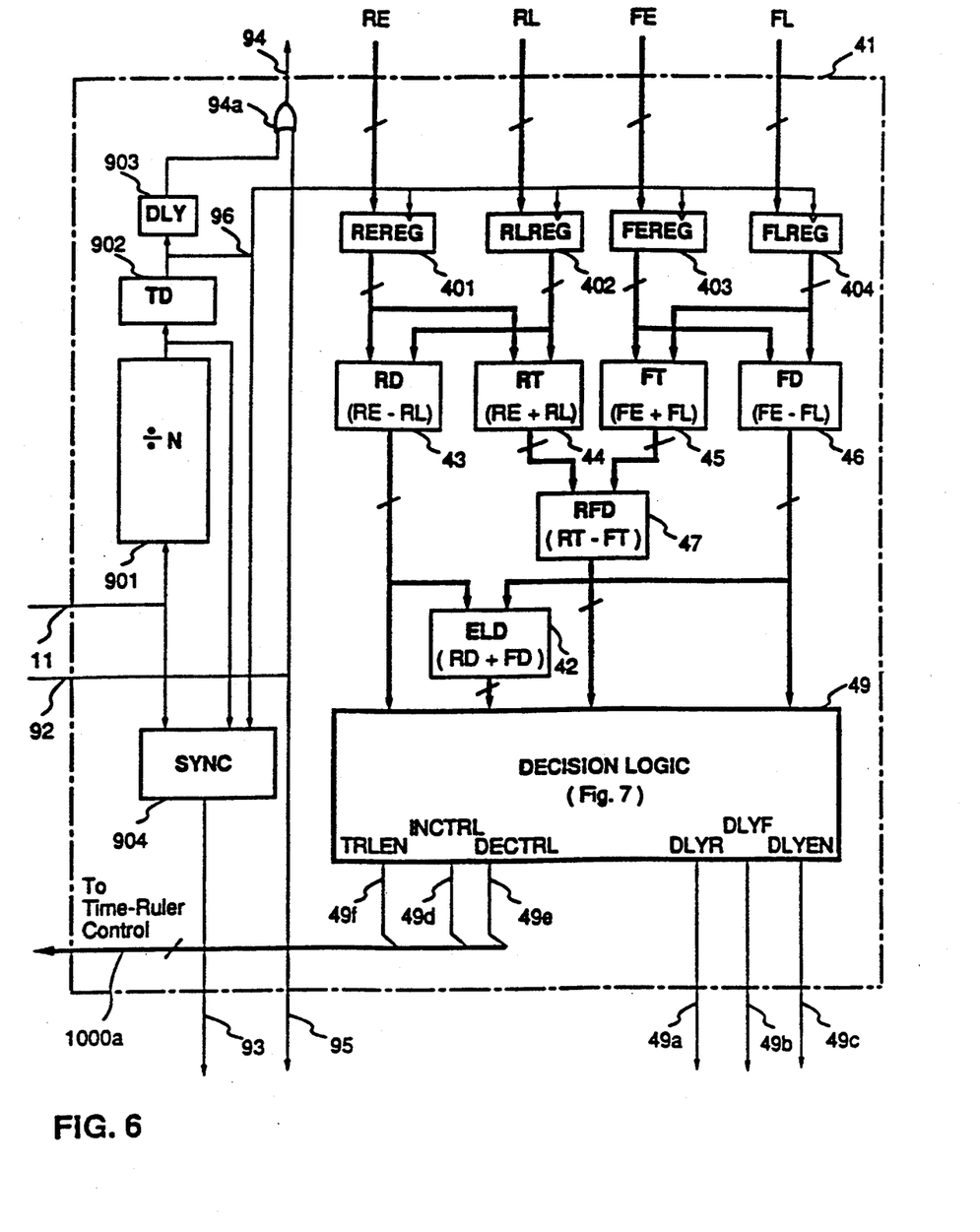
FIG. 6 is the block diagram of the Delay Adjusting Decision Circuit.

DELAY ADJUST DECISION CIRCUIT (FIG. 6)

With reference to FIG. 6, a detailed block diagram is shown illustrative of the Delay Adjust Decision block 41 from FIG. 3. The uppermost inputs to this circuit are the four outputs from the four counters: RE (Rising-Early), RL (Rising-Late), FE (Falling-Early) and FL (Falling-Late). Two subtractors 43, 46 are used to generate values RD (Rising-Difference) which is the difference between Rising-Early and Rising-Late and value FD (Falling-Difference) which is the difference between Falling-Early and Falling-Late. Adder 42 is used to produce the ELD value (Early-Late-Difference) which is the difference between total early edges and total late edges (including both rising and falling edges). Subtractor 47 generates RFD value (Rising-Falling-Difference) which is the difference between total rising edge detected and total falling edge detected. The Four values RD, FD, ELD and RFD are the four inputs to the Decision Logic 49, which function is described in the discussions with respect to FIG. 7. The Decision Logic has three outputs to the DCD Compensation Circuit 51: DLYR 49a, DLYF 49b, and DLYEN 49c. If DLYR (Delay-Rising) is a "1," and DLYF (Delay-Falling) is a "0," and if DLYEN (Delay-Enable) is a "1," the Delay for the Rising edges is incremented by a step when the Adjust Delay command SHIFCK 93 (FIG. 3 and FIG. 8) arrives. If DLYR is a "0" but DLYF is a "1," the delay for the Falling edges is incremented. When DLYEN 49c is a "0," no delay adjustment takes place regardless of the DLYR and DLYF values. The Decision Logic also provides outputs 1000a including 49d, 49e and 49f (FIG. 6) to the Time-Ruler Control Circuit in the event that it detects a steady frequency difference or bit period difference between the incoming data and the time ruler. The Time Ruler Control Circuit is described in the Related Application cited above. A logic "1" on INCTRL 49d indicates that the bit period determined by the time ruler is consistently shorter than the bit period of the incoming data and should be incremented, while a logic "1" on DECTRL 49e indicates that the time ruler needs to be shortened. TRLEN 49f is a "1" when the time ruler adjustment is enabled.

The serial data in on line 11 is used as the clock signal for the "divided by N" counter 901. For every N rising edges (or falling edges), the Transition Detector (TD) 902 generates a pulse at 96 which causes sampling and latching of samples (latches) values of the four counters into the four registers 401 through 404. N is a measure of the total rising (or falling) edges which would have arrived on the serial data line 11 when a sampling of the content of the four counters is made. The larger the N, the more edges or bits are taken into the analysis. In some applications, N may be made programmable and variable to meet different requirements. In some cases, it may be desirable to permit only two consecutive transitions to be considered as an event to increment the N counter, 901, since only "11" data sequence contributes to the DCD detection. After an appropriate delay in 903 of the TD 902 output, to ensure that the four counter status have been latched into the four registers, 401–404, the pulse in 903 gets to line 94 through the OR gate 94a to reset the four counters. Initially, the reset signal on 92 resets counters and also resets the controlled delays FIG. 8, 53 and 54 by the signal on line 95. The function of the SYNC 904 is to produce a clock signal SHIFCK on line 93 for the UP/DOWN SHIFTER 52 in the DCD compensation block 51, to adjust the delay at a proper time when the serial data is in a steady state, to maintain the data integrity. The function of the Decision Logic 49 can be better understood with reference to FIG. 7.

Figure 7:
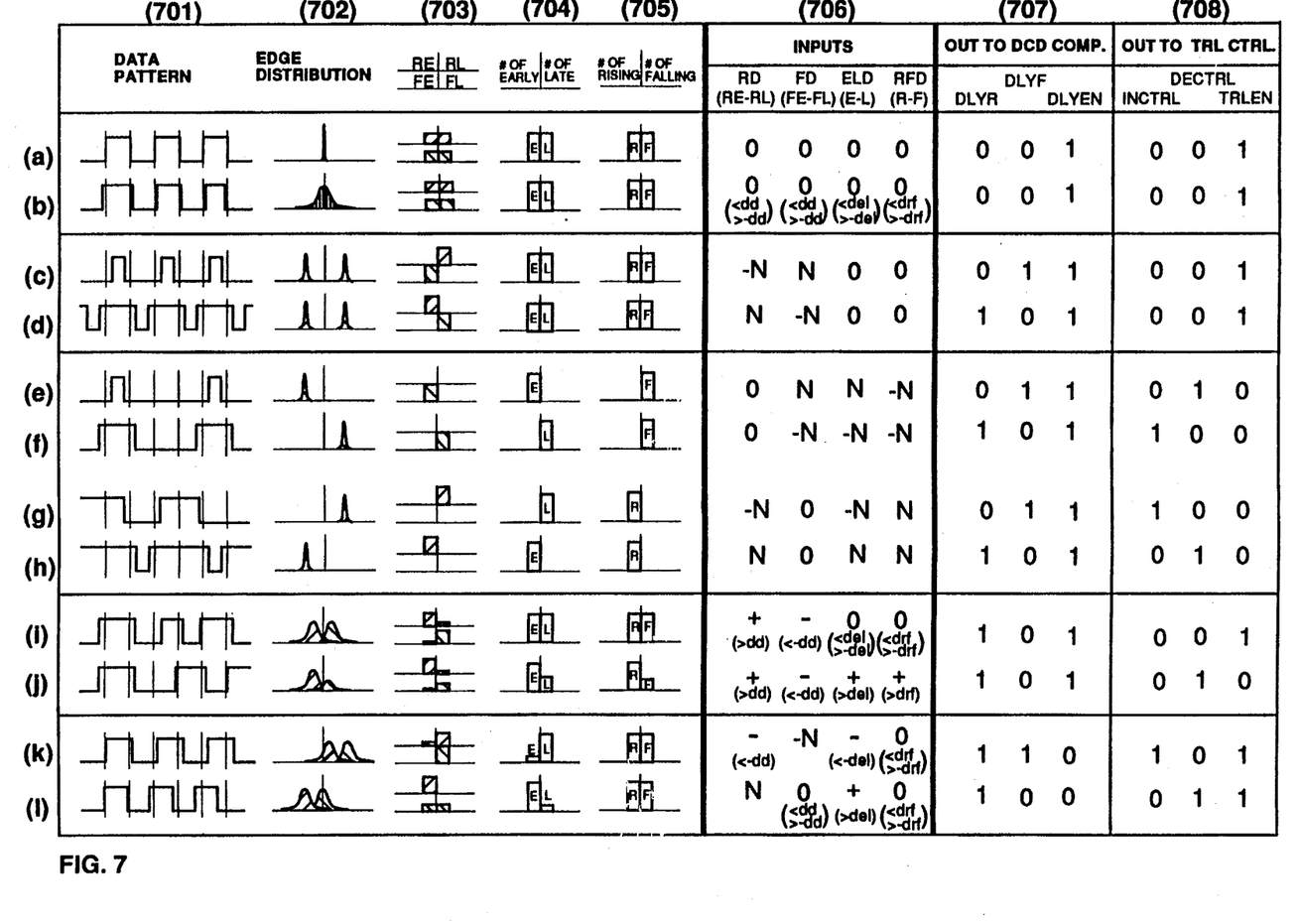
FIG. 7 shows, in a Table format, some typical signal conditions, the corresponding distribution and DCD detection result and the corresponding output status of the decision logic of FIG. 6.

In FIG. 7, the DCD conditions for various data patterns are summarized into a table. A data sequence of N rising edges and N falling edges are assumed. In row (a), a perfect 50% duty cycle square wave with no DCD associated is shown. Both ELD (Early-Late-Difference) and RFD (Rising-Falling-Difference) are perfectly balanced. Outputs to DCD compensation in column 707 are all "0s" so no DCD compensation adjustment is necessary. In row (b), no "DC" component of DCD is presented and Random Jitter (RJ) dominates. ELD and RFD are still balanced. In real life, "balanced" means less than a prespecified small number as shown in the inputs column 706. Row (c), and (d), are the situations when a dominant DCD exists. In (c), all N rising edges are detected "late" and all N falling edges are detected "early", while ELD and RFD are still balanced. Clearly, the falling edges need to be delayed in order to remove DCD. So DLYF is "1" and DLYR is "0," and DLYEN is a "1" to enable the adjustment. The situation in 7(d) is just the opposite of (c). In Rows (e) through (h) are the situations when the DCD of only one type of edge can be detected. In (e), for example, there are "0" bits between transitions ("1") (column 701) such that the "falling-early" status can be detected because the time interval to the previous rising edge is less than the bit period, while the "rising-late" status cannot be seen since the time interval for the rising edge to the previous falling edge is longer than one and one half bit period, resulting a "000" for the sampled value of 141:142:143, FIG. 4. No early-late status is detected and recorded for these rising edges. If the data pattern repeats for the whole N edges, only counter for FE (falling-early) gets an N count while the other three (FL, RE, RL) remains zero. Rows (f), (g), and (h) are similar to (e) with different DCD conditions. The result in FIG. 7(e) shows a clear indication of Falling-Early status while missing status for the rising edges. Although decisions can still be made to adjust the delays for rising or falling edges based on the DCD detected (DLYEN=1 for FIG. 7(c) through (h)), time ruler adjustments should not be made in these situations (TRLEN=0). The reason will become clear in the following discussions. The Data Patterns discussed above are somewhat "ideal" situations, and the numbers in the counters are either "N" or "0." In row (i), significant Random Jitter is also present, causing some rising edges to be detected "late" and some falling edges to be detected "early" with the majority of the rising edges detected "early" and majority falling edges detected "late." RD is then a positive number between 0 and N while FD is a negative number between 0 and −N. In real applications, a number dd can be specified as the threshold between "0" and "positive." Also, if no edge is missing, both ELD and RFD should be "0." In this example, both the rising edge status (RD>dd) and the falling edge status (FD<−dd) agree and indicate that the rising edges need to be delayed to reduce DCD, so DLYR=1 and DLYF=0 with DLYEN=1. Note that the RFD is the difference between total rising edges detected and total falling edges detected. For random data, if the data sequence is long enough, a balanced RT (Rising Total) and FT (Falling Total) can be expected. However, if the data bits collected are not sufficient, as in the situation in row (j), in which many more rising edges than falling edges are detected, it will cause an imbalanced ELD and RFD. This may not affect DCD detection and adjustment as the outputs to the DCD compensation circuit (column 707) are the same as row (i), the differences are in the outputs to the Time Ruler Control (Column 708). Note that DECTRL=1 indicating time ruler needs to be shortened while TRLEN=0 disables the adjustment. This problem could be caused by insufficient data bits accumulated for a special data sequence. Generally, if ELD is not near zero, i.e., RFD≧del, where del is a prespecified small number, a difference between the time ruler and the data bit period may exist. However, this is true for certain only if RFD is a "0" (or RFD≦drf, where drf is a prespecified small number.) Thus TRLEN (Time Ruler adjust ENable) is a "1" only if RFD≦drf. In row (K), RFD is balanced since about equal rising and falling numbers of edges have been detected, but almost all the edges are detected "late" (column 702, 704). If the total number of bits collected (N) is large enough, then a clear indication is given that there is a significant difference between the time ruler length and the data bit period, or a frequency difference between the two, and apparently that the time ruler delay is too short. INCTRL is set to "1" and TRLEN=1 enables the adjustment to increase the time ruler delay. Row (l) shows an opposite situation when the Time Ruler is longer than the bit period. In these two cases, the adjustment of the time ruler is based on the ELD value (column 704, 706) provided RFD is balanced (column 705, 706). Time Ruler adjustment is disabled for row (j) because the RFD is not balanced, even though the ELD has a value of magnitude greater than del.

In most implementations, the Time Ruler used would frequently be calibrated against a stable time reference source, and would be accurate enough for DCD detection. Accordingly, the situation of (K) and (l) may not occur. However, this scheme provides the means to detect the Time Ruler offset which can be used as an error indication or as a condition for DCD adjustment. To extract data frequency from the incoming serial data, or to self-calibrate the time ruler without a frequency reference source, the following technique can be used. First, set the controlled time ruler to its maximum value, detect the incoming data with this incorrectly set time ruler. The result will be the situation in row (l). Since the time ruler used to measure the bit interval is too long, nearly all the edges are detected "early." DECTRL is set to "1" while TRLEN=1 lets the time ruler control decrease the time ruler delay through an output on 1000a which is returned to the time ruler on bus 1000. This process continues until the length of the time ruler is reduced to close to the data period, as the situation in (i), and the DCD compensation is enabled from that point on. Depending on the step size of the time ruler adjustment, the "lock-in" may be long if N (total edges collected before a sample is made) is large. In this event, N could be selectable at different values for power up and normal operation.

Most packet data transmission systems provide a "preamble" or "idle" signals at the start and between the packets or frames, which signals are easy for data recovery circuit to use to acquire frequency lock. The "idle" states in FDDI (Fiber Distributed Data Interface) consists of all "1s" which gives a square wave at half the data frequency. Much fewer bits are required or a much smaller N can be chosen in this situation to achieve fast "lock-in," since the "early-late" status can be detected for every edge and the pattern is simple (like in situation (b)~(d)). The change in N is equivalent to the change in sampling rate and corresponds to the change in time constant or filter bandwidth of the PLL based system.

Figure 8:
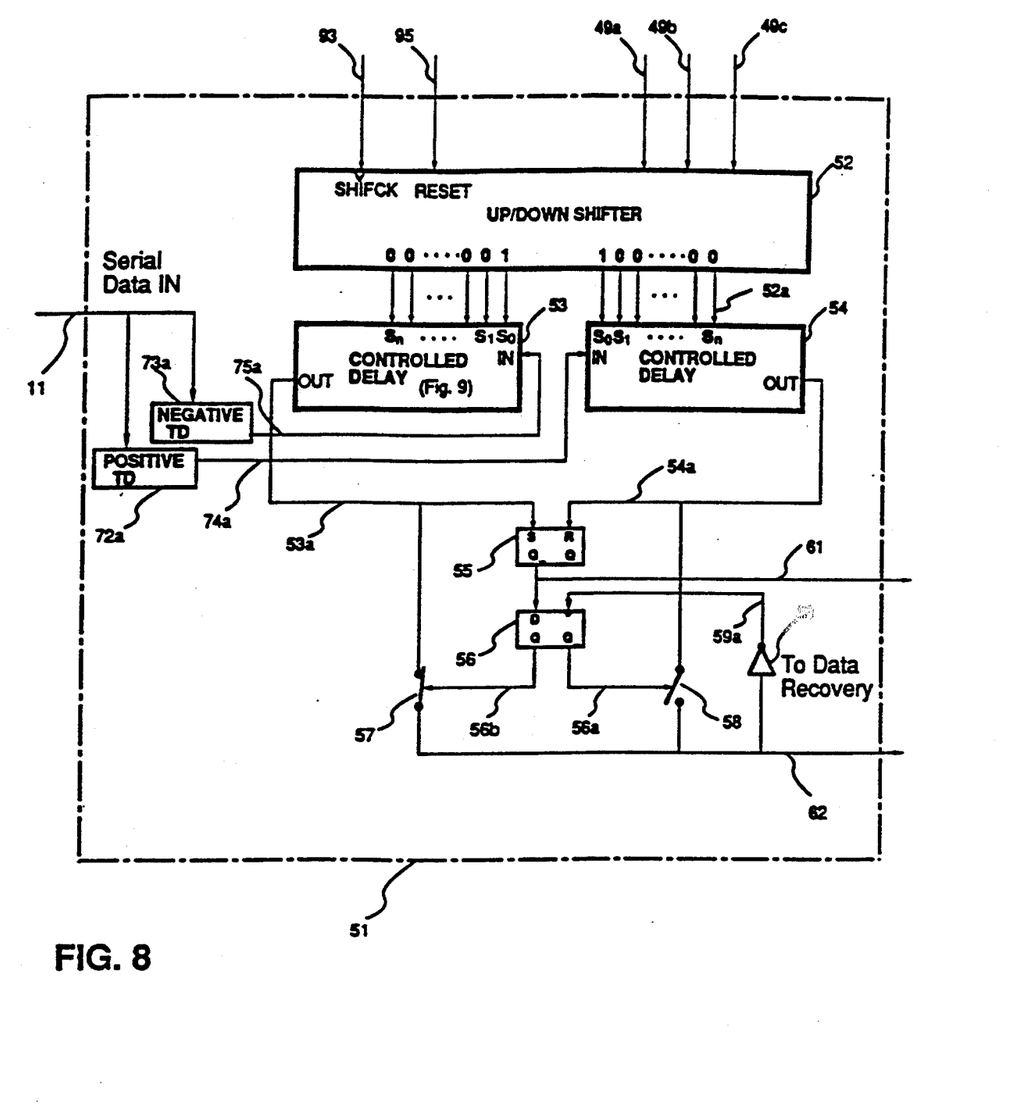
FIG. 8 is the schematic diagram of the DCD compensation block.
Figure 9A:
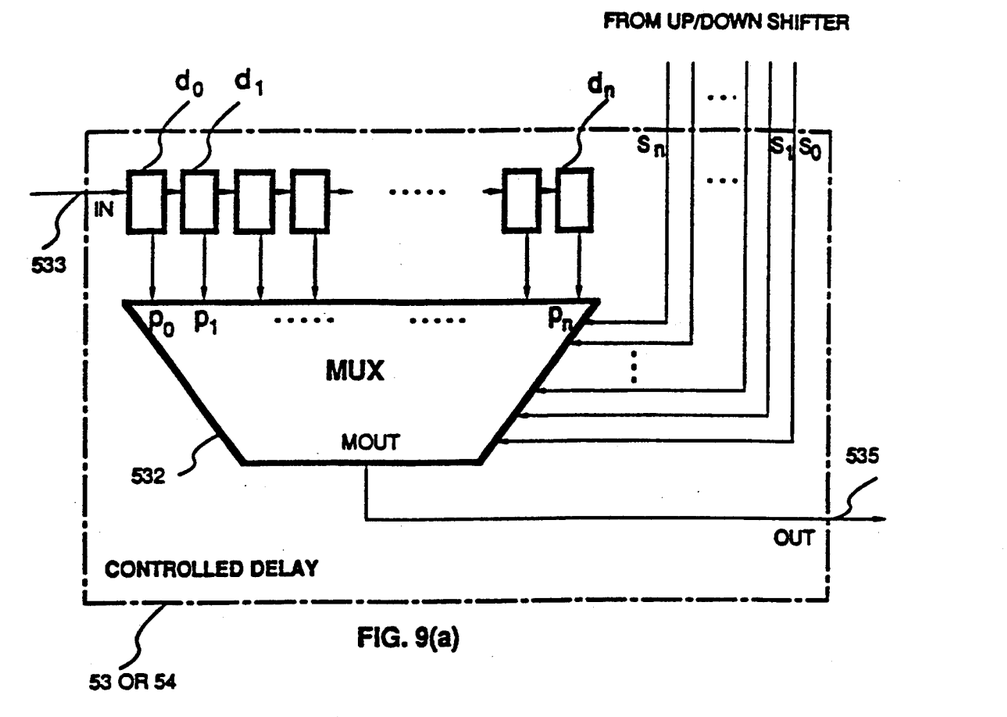
FIG. 9(a) is the block diagram of the controlled delay.
Figure 9B:
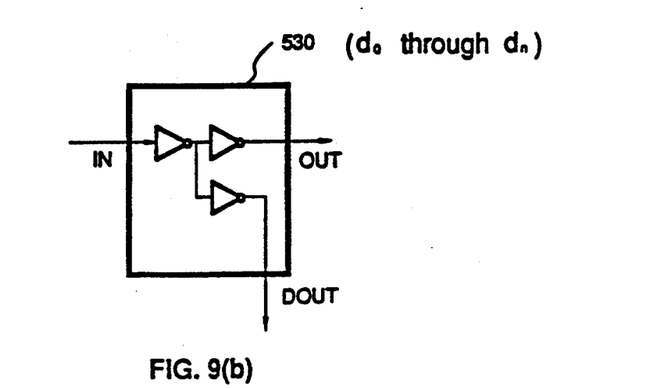
FIG. 9(b) is the schematic of a unit delay circuit.

DCD COMPENSATION (FIGS. 8,9)

With reference to FIG. 8, the DCD compensation block 51 also seen in FIG. 3, is shown in block diagram. The structure of the Controlled Delay 53 is shown in FIG. 9. The Controlled Delay 53, FIG. 9(a) consists of n delay cells ($d_0$ through $d_n$) and a MUX 532 which has n inputs ($P_0$ through $P_n$) and n control lines (So through Sn). At any time, only one control line is at logic "1" while all others are at logic "0." The control line which is at "1" selects the delay path. The delay from IN 533 to OUT 535 is the sum of the delay of the delay cells selected to be effective and the delay of the MUX. The delay cell is shown in FIG. 9(b), 530. The delay from IN to OUT is the delay step $t_{step}$ and $t_{dop}$ is the delay from IN to DOUT. Referring back to FIG. 9(a), when $S_O$ is selected, the Path from $P_O$ to the OUT line is enabled while all others are disabled. We may use a code "100 . . . 00" to represent logic values from $S_0$ through $S_n$. The delay for this code $t_o$ is the sum of $t_{dop}$ and $t_{mux}$ (the delay from $P_0$ to MOUT) where $t_o = t_{mux} + t_{dop} = t_{int}$ where $t_{int}$ is the intrinsic delay of the Controlled Delay.

When $S_1$ is selected, or for code "010 . . . 00," the delay t1 is:

$$t_1 = t_{mux} + t_{dop} + t_{step} = t_{int} + t_{step}$$

When $S_2$ is selected, or for code "0010 . . . 00," the delay $t_2$ is $$t_2 = t_{mux} + t_{dop} + 2 \times t_{step} = t_{int} + 2 t_{step}$$

and so on, the maximum delay for code "00 . . . 001" will be $$t_n = t_{mux} + t_{dop} + n{}^*t_{step} = t_{int} + n{}^*t_{step}$$

Note that we assumed the delays from $P_O$ (through $P_n$) to MOUT are all the same ($t_{dop}$).

Figure 10:
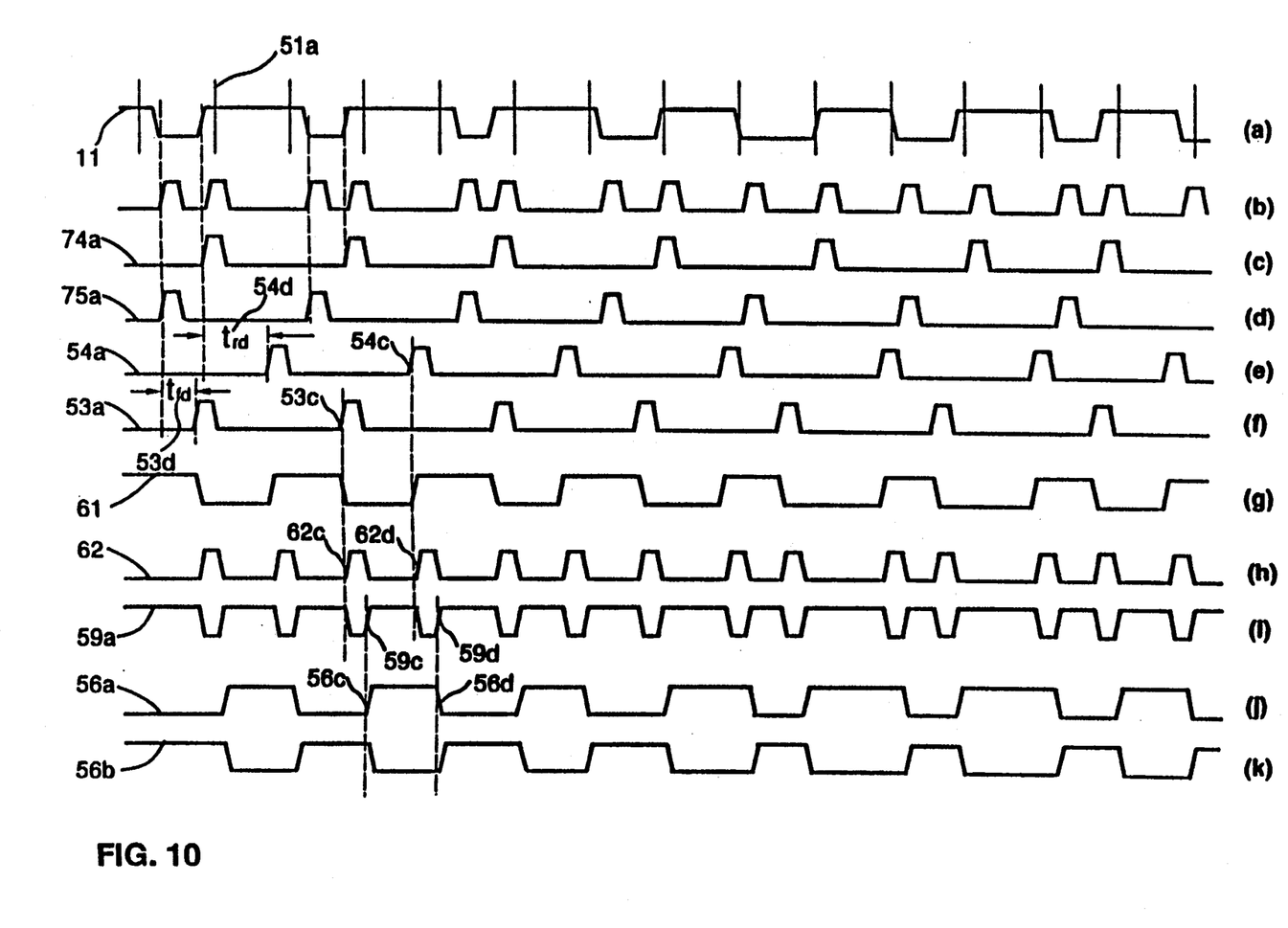
FIG. 10 is the timing diagram for FIG. 8.

Referring back to FIG. 8, the Up/Down Shifter 52 controls the two Controlled Delays 53 and 54. Initially, it is reset to the code as shown in the Figure by a reset signal from line 95, or both 53 and 54 are selected to delay only the amount of the intrinsic delay time. Controlled Delay 53 takes the signal from line 75a which is the output from negative transition detector 73a as the falling edge timing pulses, FIG. 10(d), while Controlled Delay 54 takes the pulses on line 74a from the Positive Transition Detector 72a for the rising edge timing pulses, FIG. 10(c).

If the signal DLYR on line 49a is "1" and DLYEN=1 on line 49c is also a "1," "Rising-Early" status is indicated and rising edges need to be delayed more than the falling edges. When the shift clock SHIFCK comes on line 93, the control code for 54 becomes "01000 . . . 00" or a UP-SHIFT is performed. The control code for 53 remains unchanged. The Pulses correspond to rising edges on line 74a is delayed an extra step ($t_{step}$) than the pulses correspond to falling edges on line 75a. When the next SHIFCK comes, if DLYR=1 and DLYEN=1 are still true, indicating that additional delay step for rising edges are needed, the code changes to "0010 . . . 00" and the pulses on line 74a get $2t_{step}$ more delays than those on line 75a. This process continues until the DCD detection and decision circuit decides that the DCD has been canceled such that both DLYR and DLYF are "0" to prevent the shifter from further shifting. The delay for the rising edge pulses on line 54a ($t_{rd}$ 54d, FIG. 10 (e)) is K steps larger than the delay for the falling edge pulses on line 53a, ($t_{fd}$ 53d, FIG. 10(f)). These two pulse trains trigger the RS latch 55 alternatively. A DCD jitter canceled serial data is regenerated on line 61 (FIG. 10(g)). The two pulse trains 54a and 53a are multiplexed into a single pulse train on line 62 (FIG. 10(h)) through Switches 57 and 58. Refer to FIG. 10. For example, pulse 53c from a detected rising edge on line 53a sets RS Latch 55, so that it's Q_ output (OR) becomes "0." This pulse passes through the "ON" switch 57 (56b is "1") to have a pulse 62c on line 62. After being inverted by invertor 59 the rising edge of the inverted wave 59c (or the falling edge of 62c) on line 59a latches the D input value "0" of DFF 56 (line 61) so that its Q output (56b) becomes "0" and its Q_ output (56a) becomes "1." This effectively flips switches 57 and 58 such that next time when pulse 54c on line 54a comes it gets through switch 58 (since 56a is "1") to generate 62d on line 62, FIG. 10(h). FIG. 10(b) shows the transition detector output waveform if it is directly detecting transitions without DCD cancellation. Obviously, these pulses are not spaced evenly due to large DCD jitter of the data, causing difficulties in data recovery. When a large DCD jitter associated with two consecutive transitions occurs, the two pulses get too close such that the pulse width has to be extremely small to avoid merging together. With the methods of this invention, this problem is lessened since separate transition detection for rising or falling edges is performed. The pulses for both edges are multiplexed together only after DCD is canceled or they are repositioned as in (h). The control signals for the switches 56a and 56b are shown in (j) and (k). In the copending referenced application AMD Docket A860, the Time-Ruler data recovery methods employs transition detection as the first step. Output 62 of FIG. 8 can then be directly used by the Time-Ruler measurement of that circuit.

From the above description, it is apparent that a novel method and apparatus is disclosed for reducing DCD jitter. It is not our intention to limit our invention to the specific embodiments of our drawings since there are other forms within our concepts to achieve our invention. Accordingly, the scope of our invention should be determined by our claims.

With this in view,

What is claimed is:

1. A method for correcting for the effects of duty cycle distortion, (DED) jitter in an input serial binary data stream comprising:

sampling a delayed version of said input serial binary data stream at the instant each transition of said input serial binary data stream occurs to obtain timing error data;

determining, using said timing error data histogram data regarding the timing of transitions in said input serial binary data stream with respect to an ideal transition time;

analyzing said histogram data to provide an indication of the portion of jitter due to DCD because of early occurrence of rising transitions of said input serial binary data stream; and correcting said input serial binary data stream responsive to said indication of the portion of jitter due to early rising transitions by shifting the timing of some of the transitions in said input serial binary data stream to reduce peak-to-peak distribution of said jitter.

2. A method for correcting duty cycle distortion (DCD) jitter in a digital pulse train having falling transitions between a high and a low value and rising transitions between a low and a high value comprising:

(a) sampling a delayed version, of said digital pulse train at the instant of occurrence of each transition of said digital pulse train to obtain timing error data:

(b) determining and comparing the time differences between adjacent transitions in said digital pulse train using said timing error data to determine whether the time interval of the group of rising to falling intervals is consistently greater or less than the time interval of the group of falling to rising intervals; and (c) compensating for said differences in time interval between said transitions by inserting a delay in said digital pulse train before said transitions of the group with early transition; and (d) repeating steps (b) and (c) until the result of step (b) indicates that the rising to falling interval is equal to the falling to rising interval.

3. A method of correcting for duty cycle distortion (DCD) jitter in an incoming serial binary data stream having rising and falling transitions comprising:

sampling a delayed version of said incoming serial binary data stream at the instant of occurrence of each transition of said incoming serial binary data stream to obtain timing error data;

analyzing said timing error data to indicate the portion of jitter due to DCD in rising transitions of said incoming binary serial data;

generating a first plurality of signals indicating whether said rising transitions are early or late compared to an epoch; and correcting said incoming serial binary data stream by adjusting, responsive to said first plurality of signals, the time of said rising transitions of said incoming serial binary data stream.

4. The method of claim 3 further including analyzing said timing error data to indicate the portion of jitter due to DCD in falling transitions of said incoming serial binary data;

generating a second plurality of signals indicating whether said falling transitions are early or late compared to an epoch; and correcting said incoming serial binary data by adjusting, responsive to said second plurality of signals, the time of said falling transitions of said incoming binary serial data stream.

5. A method of correcting for DCD jitter in an incoming serial non-return-to-zero-inverted data stream comprising:

detecting rising transitions in said incoming serial NRZI data stream and generating a first pulse upon detection of said rising transitions;

detecting falling transitions in said incoming serial NRZI data stream and generating a second pulse upon detection of said falling transitions;

launching said incoming serial data stream into a serially connected three-unit time delay, wherein the time delay in each unit equals $\frac{1}{2} T_b$, where $T_b$ equals the period of the bit clock of said incoming serial data stream;

latching the outputs of said three-unit time delay into a first plurality of state machine registers upon occurrence of said first pulse;

latching the outputs of said three-unit time delay into a second plurality of state machine registers upon occurrence of said second pulse;

combinatorially connecting said first plurality of state machine registers to obtain first logic signals indicating said rising transitions are early or late compared to an epoch;

combinatorially connecting said second plurality of state machine registers to obtain second logic signals indicating whether said falling transitions are early or late compared to an epoch; and correcting said incoming serial NRZI data stream by adjusting delay times of said rising and falling transitions of said incoming serial NRZI data stream responsive to said first and second logic signals respectively.

6. Apparatus for modifying an incoming binary serial data stream to reduce the Duty Cycle Distortion (DCD) jitter comprising:

means for performing an on-the-fly analysis of the probability of the time between transition edges and epoch time of said incoming binary serial data stream including, a. a transition detection means, said transition detection means being connected to receive said incoming binary serial data stream, said transition detection means having an output;

b. a series connection of a three-unit time delay circuit, each said time delay of said three unit time delay circuit having a delay time being $\frac{1}{2} T_b$, where $T_b$ is the bit clock period of said incoming binary serial data stream, said first unit of said three-unit time delay circuit of said series connection being connected to receive said incoming binary serial data stream, each said unit of said three unit time delay circuit having an output;

c. a plurality of state devices, each of said plurality of state devices having a strobe input, a second input and an output, said output of each of said unit time delay being connected to said second input of said plurality of state devices, the output of said transition detection means being further connected to said strobe input of each of said plurality of state devices;

d. combinatorial logic means, said combinatorial logic means being coupled to said state device outputs for providing a first signal if the rising transition is early with respect to said epoch time and second signal if the rising transition is late with respect to said epoch time; and, a DCD compensation circuit, said DCD compensation circuit being connected to receive said incoming binary serial data stream, and said DCD compensation circuit being coupled to receive said first signal and said second signal wherein said DCD compensation circuit compensates said DCD jitter responsive to said first and second signals.

7. Apparatus of claim 6 wherein said transition detection means includes, a first detector which provides a first narrow pulse output on detection of a rising, positive going transition of said incoming binary serial data stream, and a second detector which provide a second narrow pulse output on detection of a falling, negative going transition of said incoming binary serial data stream.

8. The apparatus of claim 7 wherein said combinatorial logic means also provides a third signal if the falling transition is early and a fourth signal if the falling transition is late.

9. The apparatus of claim 7
wherein said DCD compensation circuit includes means responsive to said first and second signals to selectively insert delays in said incoming binary serial data stream to reduce said DCD in said rising transitions.

10. The apparatus of claim 9 wherein said DCD compensation circuit is also responsive to said third and fourth signals to insert delays in said incoming binary serial data stream to reduce said DCD in said falling transitions.

11. The apparatus of claim 7 wherein said plurality of state devices comprise of first group of said state devices and a second group of said state devices, wherein said strobe input of said first group of said state devices is connected to said first narrow pulse output of said first detector and wherein said strobe input of said second group of said state devices is connected to said second narrow pulse output of said second detector.

* * * * *